(12) United States Patent
Zhang (10) Patent No.: US 10,142,408 B2
(45) Date of Patent: Nov. 27, 2018

(54) HARDWARE LOADING ADJUSTING METHOD AND RELATED ELECTRONIC DEVICE

(71) Applicant: Wistron Corporation, New Taipei (TW)

(72) Inventor: Chong Zhang, New Taipei (TW)

(73) Assignee: Winstron Corporation, New Taipei (TW)

( * ) Notice: Subject to any disclaimer, the term of this patent is extended or adjusted under 35 U.S.C. 154(b) by 355 days.

(21) Appl. No.: 15/052,892

(22) Filed: Feb. 25, 2016

(65) Prior Publication Data

US 2017/0078381 A1  Mar. 16, 2017

(30) Foreign Application Priority Data

Sep. 14, 2015 (CN) .......................... 2015 1 0582744

(51) Int. Cl.
*G06F 15/16* (2006.01)
*H04L 29/08* (2006.01)
*H04L 29/06* (2006.01)

(52) U.S. Cl.
CPC ...... *H04L 67/1029* (2013.01); *H04L 67/1097* (2013.01); *H04L 67/2828* (2013.01); *H04L 69/04* (2013.01)

(58) Field of Classification Search
None
See application file for complete search history.

(56) References Cited

U.S. PATENT DOCUMENTS

| 8,810,944 | B1* | 8/2014 | Katagiri | G11B 20/1886 360/53 |
| 2009/0198830 | A1* | 8/2009 | Zhang | H04L 47/10 709/233 |
| 2009/0259324 | A1* | 10/2009 | Won | G11B 20/10527 700/94 |
| 2010/0095029 | A1* | 4/2010 | Katagiri | G11B 15/32 710/52 |
| 2011/0116185 | A1* | 5/2011 | Katagiri | G11B 15/1875 360/73.04 |
| 2013/0275396 | A1* | 10/2013 | Condict | H03M 7/30 707/693 |
| 2014/0173055 | A1* | 6/2014 | Yu | H04L 65/607 709/219 |

(Continued)

FOREIGN PATENT DOCUMENTS

CN  103873889 A  6/2014

OTHER PUBLICATIONS

Office action dated Mar. 28, 2016 for the Taiwan application No. 104133372, filing date: Oct. 12, 2015, p. 2 line 24-26, p. 3 and p. 4 line 1-6

*Primary Examiner* — Natisha D Cox
(74) *Attorney, Agent, or Firm* — Winston Hsu (57) ABSTRACT

A hardware loading adjusting method includes performing a first thread for receiving and decompressing the compressed data, to generate and to store decompressed data to a first storage module by a first speed; performing a second thread for storing the decompressed data to a second storage module by a second speed; and adjusting a ratio between the size of the compressed data and the decompressed data stored in the first storage module and the size of the first storage module according to the relationship between the first speed and the second speed.

12 Claims, 4 Drawing Sheets

(56) References Cited

U.S. PATENT DOCUMENTS

2014/0333642 A1\* 11/2014 Chiang ..................... G06T 1/00
                                                          345/534
2016/0210065 A1\*  7/2016 Bi ....................... G06F 12/0802
2017/0302598 A1\* 10/2017 Jansson ............... H04L 65/4084

\* cited by examiner

HARDWARE LOADING ADJUSTING METHOD AND RELATED ELECTRONIC DEVICE

BACKGROUND OF THE INVENTION

1. Field of the Invention

The present invention relates to a hardware loading adjusting method and related electronic device, and more particularly, to a hardware loading adjusting method capable of balancing hardware loadings and related electronic device.

2. Description of the Prior Art

With the advances in the communication technology, the user can rapidly read and store required information via the network with low transmission delays. In such a condition, the information can be stored in remote servers and does not required to be stored in the personal computer (PC) of the user. When the user needs to use (e.g. read or edit) the information, the user can download the information to the PC. The cost of the user spent on the storage equipment therefore can be reduced. Furthermore, when storing the information on the remote server, the information can be on-line edited by multiple users. Even if the users are at different locations, the users still can work together. The cost of the commutations and time are saved, therefore. In addition, the user may synchronize the information in the computers located at different places via storing the information in the remote server, to keep the information to be the latest version. When the user uses the information at different place, the user can directly use the information of the latest version without considering the version editing history.

The abovementioned service is also called cloud service. In order to provide the cloud service, the industry begins to purchase and configure a large number of servers (i.e. the remote servers), to store the significant amount of user information. When the server receives and stores data from other servers or from user equipment via the network, the server may not operate in the optimal efficiency because the network speed and the processing speed of each of the hardware devices in the server vary under different conditions. Thus, how to adjust the loading of each of the hardware devices in the server becomes a topic to be discussed.

SUMMARY OF THE INVENTION

In order to solve the above problem, the present invention provides a hardware loading adjusting method capable of balancing hardware loadings and related electronic device.

In an aspect, the present invention discloses a hardware loading adjusting method. The hardware loading adjusting method comprises performing a first thread for receiving and decompressing the compressed data, to generate and to store decompressed data to a first storage module by a first speed; performing a second thread for storing the decompressed data to a second storage module by a second speed; and adjusting a ratio between the size of the compressed data and the decompressed data stored in the first storage module and the size of the first storage module according to the relationship between the first speed and the second speed.

In another aspect, the present invention discloses an electronic device. The electronic device comprises a first storage module; a second storage module; a computing module, for performing a first thread for receiving and decompressing the compressed data to generate and to store decompressed data to a first storage module by a first speed; performing a second thread for storing the decompressed data to a second storage module by a second speed; and adjusting a ratio between the size of the compressed data and the decompressed data stored in the first storage module and the size of the first storage module according to the relationship between the first speed and the second speed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
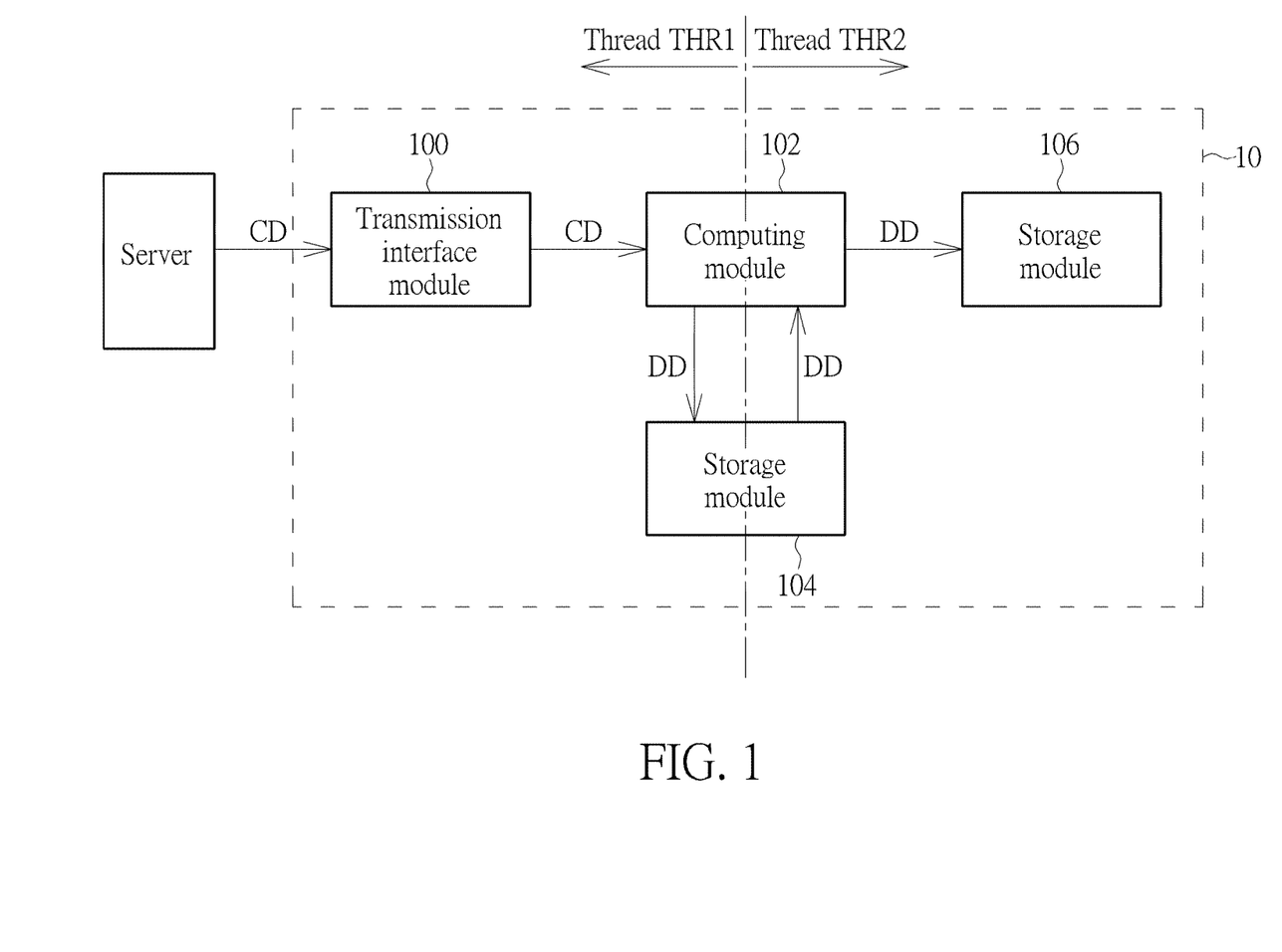
FIG. 1 is a schematic diagram of an electronic device according to an example of the present invention.

Please refer to FIG. 1, which is a schematic diagram of an electronic device 10 according to an example of the present invention. The electronic device 10 may be an electronic product such as a laptop, a personal computer or a server, and is not limited herein. As shown in FIG. 1, the electronic device 10 comprises a transmission interface module 100, a computing module 102, and storage modules 104 and 106. The transmission interface module 100 may be a communication component such as a network card and is utilized for transmitting data between a server and the electronic device 10. The computing module 102 may be a computing component such as a microprocessor, a central processing unit (CPU), a system-on-a-chip (SoC), and is not limited herein. The computing module 102 is utilized to perform a thread THR1, for downloading compressed data CD from the server and for decompressing the compressed data, to generate and store decompressed data DD to the storage module 104 by a speed S1. The computing module 102 further performs a thread THR2, for writing the decompressed data DD stored in the storage module 104 into the storage module 106 by a speed S2. In an example, the storage module 104 is a buffer consisted of random access memory (RAM) or static random access memory (SRAM) and the storage module 106 is a non-volatile memory such as a hard-disk, and are not limited herein. According to the relationship between the speeds S1 and S2, the computing module 102 adjusts the size of the compressed data CD and/or the decompressed data DD stored in the storage module 104. The performance of the electronic device 10 is optimized, therefore.

When the speed S1 is equal to the speed S2, the size of the decompressed data DD stored in the storage module 104 per unit time is equal to that of the decompressed data DD wrote into the storage module 106 per unit time. That is, the storage capacity occupied by the decompressed data DD in the storage module 104 remains the same because the speeds of storing and reading are the same. Under such a condition, the performance of the electronic device 10 is optimized. On the other hand, if the speed S1 is higher than the speed S2, the size of the decompressed data DD stored in the storage module 104 per unit time is greater than that of the decompressed data DD wrote into the storage module 106 per unit time. The capacity occupied by the decompressed data DD in the storage module 104 continuously rises, therefore. In order to avoid the decompressed data DD occupies all of the storage capacity of the storage module 104, the computing module 102 decreases the speed S1 of receiving the compressed data CD and decompressing the compressed data CD to generate and to store the decompressed data DD to the storage module 104, to make the speed S1 equal to the speed S2.

Figure 2:
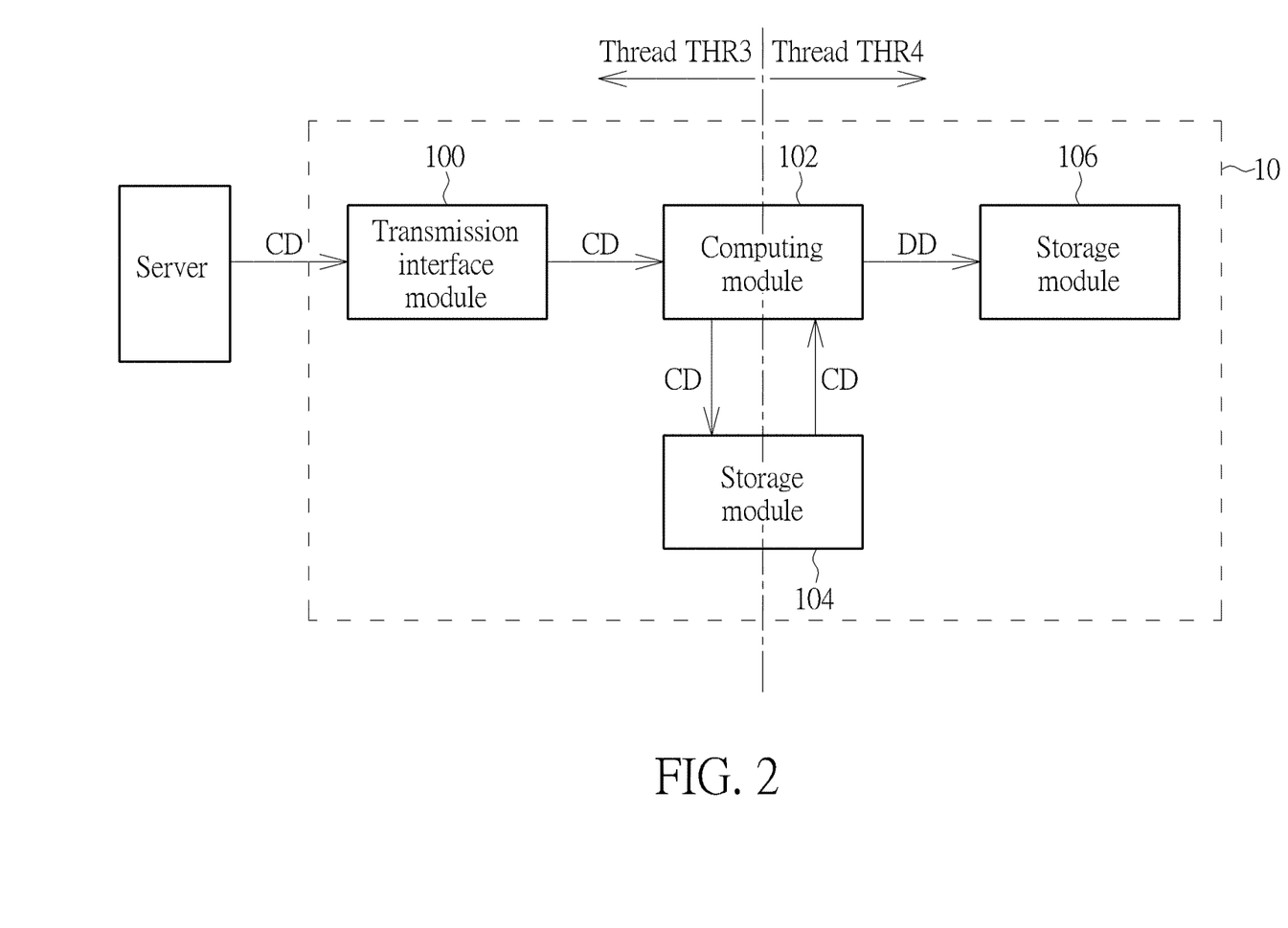
FIG. 2 is another schematic diagram of the electronic device shown in FIG. 1.

When the speed S1 is lower than the speed F2, the size of the decompressed data DD stored in the storage module 104 per unit time is smaller than that of the decompressed data DD wrote into the storage module 106 per unit time. Under such a condition, the computing module 102 calculates a ratio Q between the speed S1 and a sum of the speeds $$\left(\text{i.e. } \frac{S2}{S1+S2}\right)$$

and detects a ratio R between the size of the decompressed data DD and the compressed data CD stored in the storage module 104 and the storage size of the storage module 104. When the ratio R is smaller than the ratio Q, the computing module 102 changes to perform threads THR3 and THR4 as shown in FIG. 2. In FIG. 2, the computing module 102 performs the thread THR3 for receiving and storing the compressed data CD into the storage module 104 by a speed S3. In addition, the computing module 102 performs the thread THR4 for reading the compressed data CD from the storage module 104 and decompressing the compressed data CD, to generate and to store the decompressed data DD into the storage module 106 by a speed S4. In other words, the computing module 102 puts the decompression process into the thread of storing the decompressed data DD into the storage module 106 when the ratio R is smaller than the ratio Q. The speed S3 of receiving the compressed data CD is higher than the speed S4 of decompressing the compressed data CD and storing the decompressed data DD into the storage module 106, resulting that the ratio R continuously increases. When the ratio R increases to exceed the ratio Q, the computing module 102 changes to perform the threads THR1 and THR2, as shown in FIG. 1. That is, the computing module 102 puts the decompression progress back to the thread of receiving the compressed data CD when the ratio R is greater than the ratio Q. The ratio R is decreased, therefore. Via adopting the above processes, the loadings of components in the electronic device 10 are balanced and the performance of the electronic device 10 is optimized.

In an example, the computing module 102 receives, via the transmission interface module 100, the compressed data CD by a receiving speed SR MB/sec; decompresses the compressed data CD to generate the decompressed data DD by a decompressing speed SD MB/sec; and writes the decompressed data DD to the storage module 106 by a writing speed SW MB/sec. In addition, the compression ratio of the compressed data CD is X %. Under such a condition, the speed S1 of the computing module 102 performing the thread THR1 can be expressed as the following equations:

$$S1 = \frac{\frac{1}{X}}{\frac{1}{SR}+\frac{1}{SD}} \quad (1)$$

The speed S2 of the computing module 102 performing the thread THR2 is equal to the writing speed SW. When the speed S1 is equal to the speed S2, the electronic device 10 is optimized. The computing module 102 does not adjust the receiving speed SR, the decompressing speed SD or the writing speed SW. When the speed S1 is higher than the speed S2, the computing module 102 adjusts at least one of the receiving speed SR and the decompressing speed SD, to make the speed S1 equal to the speed S2. In an example, the computing module 102 decreases the receiving speed SR of receiving the compressed data CD, so as to allow the server connected to the electronic device 10 to connect to other electronic devices.

When the speed S1 is smaller than the speed S2, the computing module 102 calculates the ratio Q between the speed S1 and the sum of the speeds S1 and S2. The ratio Q can be expressed as:

$$Q = \frac{S2}{S1+S2} = \frac{SW}{\frac{\frac{1}{X}}{\frac{1}{SR}+\frac{1}{SD}}+SW} \quad (2)$$

Figure 3:
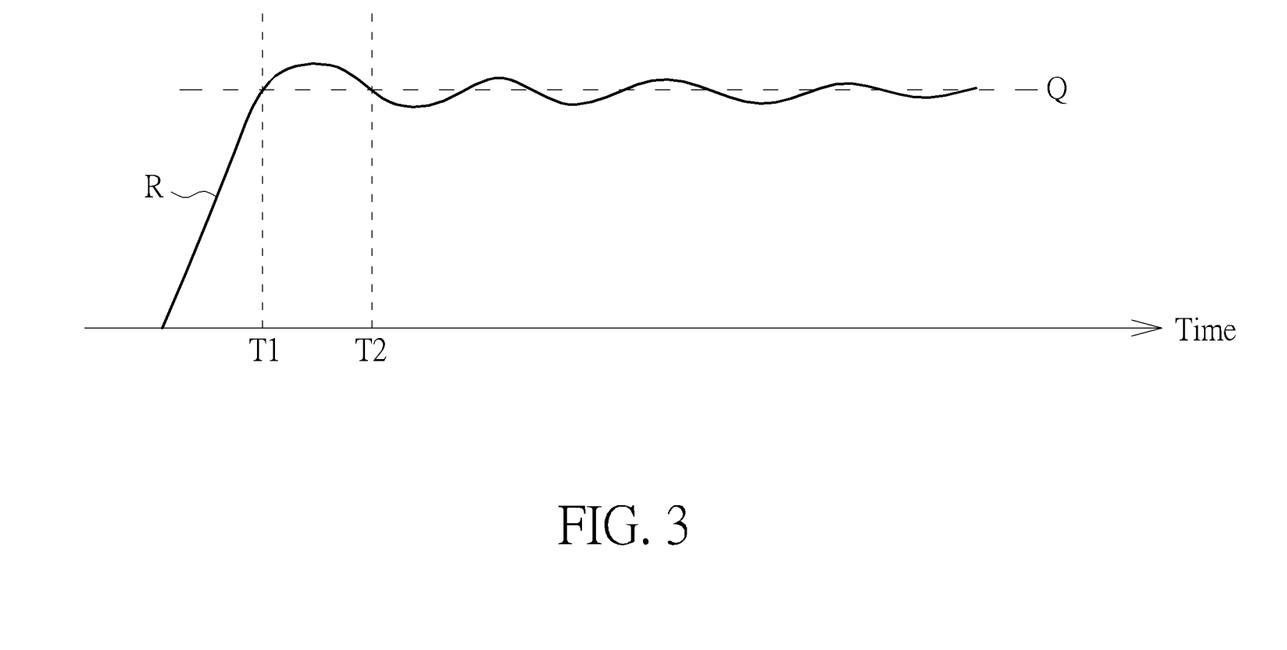
FIG. 3 is a schematic diagram of related signals of the electronic device shown in FIG. 1.

After acquiring the ratio Q, the computing module 102 continuously detects the ratio R between the storage size of the compressed data CD and the decompressed data DD stored in the storage module 104 and the storage size of the storage module 104. When the ratio R is greater than the ratio Q, the computing module 102 performs the threads THR1 and THR2; and when the ratio R is smaller than the ratio Q, the computing module 102 changes to perform the threads THR3 and THR4. In other words, the computing module 102 performs the decompression process in the thread of receiving the compressed data CD or in the thread of storing the decompressed data DD into the storage module 106 according to the relationship between the ratios R and Q. Please refer to FIG. 3, which is a schematic diagram of the ratio R between the storage size of the compressed data CD and the decompressed data DD stored in the storage module 104 and the storage size of the storage module 104. In FIG. 3, the computing module 102 performs the threads THR3 and THR4 because the speed S1 is smaller than the speed S2 and the ratio R continuously increases. At a time T1, the ratio R exceeds the ratio Q, the computing module 102 changes to perform the threads THR1 and THR2, to decrease the ratio R. At a time T2, the ratio R becomes smaller than the ratio Q, the computing module 102 changes to perform the threads THR3 and THR4. As shown in FIG. 3, the ratio R bounces up and down at the ratio Q when the speed S1 is smaller than the speed S2.

The above examples compare the speed of performing the thread THR1 (i.e. the speed of receiving and decompressing the compressed data CD) and the speed of performing the thread THR2 (i.e. the speed of storing the decompressed data DD into the storage module 106) to adjust the loading of each component in the electronic device 10, so as to optimize the performance of the electronic device 10. According to different applications and design concepts, those with ordinary skill in the art may observe appropriate alternations and modifications. For example, the ratio Q may be a predetermined value (e.g. 70%) and does not vary with the speeds S1 and S2.

Figure 4:
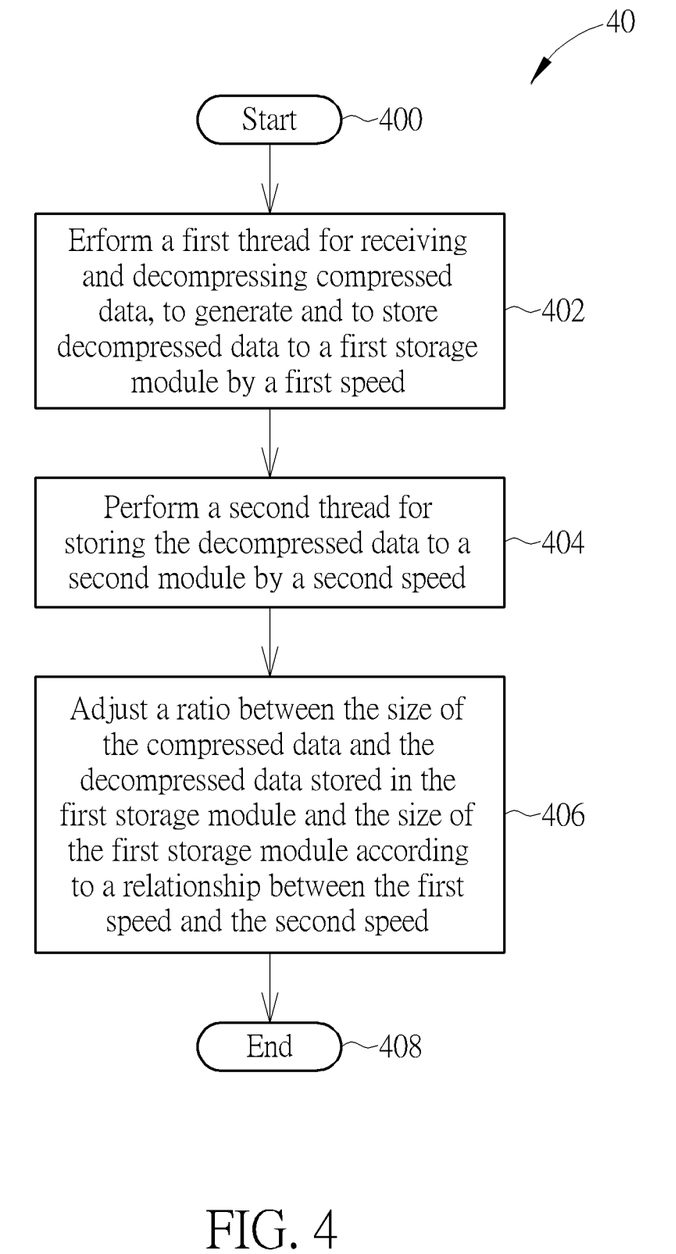
FIG. 4 is a flowchart of a hardware loading adjusting method according to an example of the present invention.

The process of the computing module 102 receiving, decompressing the compressed data CD and storing the decompressed data DD into the storage module 106 can be summarized into a hardware loading adjusting method 40 as shown in FIG. 4. The hardware loading adjusting method 40 is utilized in an electronic device, such as a laptop, a personal computer, or a server, and comprises the following steps:

Step 400: Start.

Step 402: Perform a first thread for receiving and decompressing compressed data, to generate and to store decompressed data to a first storage module by a first speed.

Step 404: Perform a second thread for storing the decompressed data to a second module by a second speed.

Step 406: Adjust a ratio between the size of the compressed data and the decompressed data stored in the first storage module and the size of the first storage module according to a relationship between the first speed and the second speed.

Step 408: End.

According to the hardware loading adjusting method 40, the first thread and the second thread are performed for receiving, decompressing compressed data to generate and to store decompressed data to a first storage module by a first speed (e.g. the speed S1), and for storing the decompressed data into a second storage module by a second speed (e.g. the speed S2). In an example, the compressed data of a first size is received by a receiving speed and the compressed data of the first size is decompressed by a decompressing speed to acquire the decompressed data of a second size. In this example, the first speed is acquired by dividing a ratio between the second size and the first size by the sum of the reciprocal of the receiving speed and the reciprocal of the decompressing speed (e.g. the equation (1)). According to the relationship between the speeds S1 and S2, the ratio between the size of the compressed data and the decompressed data stored in the first storage module and the size of the first storage module is adjusted. When the first speed is greater than the second speed, the first speed is decreased. In an example, at least one of the receiving speed of receiving the compressed data and the decompressing speed of decompressing the compressed data is decreased. When the first speed is smaller than the second speed, a first ratio between the speed S1 and the sum of the speeds S1 and S2 is calculated and a second ratio between the size of data of the first thread and the second thread in the first storage module and the size of the first storage module is detected. When the second ratio is greater than the first ratio, the first thread and the second thread are performed. When the second ratio is smaller than the first ratio, a third thread is performed for receiving the compressed data and a fourth thread is performed for decompressing the compressed data to generate and to store the decompressed data to the second storage module. In other words, the decompression progress is performed in different threads (i.e. the thread of receiving the compressed data or the thread of storing the decompressed data into the second storage module) according to the relationship between the first ratio and the second ratio.

To sum up, the above examples compare the speed of receiving and decompressing the compressed data and that of storing the decompressed data to adjust the loadings of the hardware in the electronic device, so as to optimize the performance of the electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hardware loading adjusting method, comprising:
performing a first thread for receiving and decompressing the compressed data, to generate and to store decompressed data to a first storage module by a first speed;
performing a second thread for storing the decompressed data to a second storage module by a second speed; and
adjusting a ratio between the size of the compressed data and the decompressed data stored in the first storage module and the size of the first storage module according to the relationship between the first speed and the second speed.

2. The hardware loading adjusting method of claim 1, wherein when receiving the compressed data of a first size by a receiving speed and decompressing the compressed data of the first size to the decompressed data of a second size by a decompressing speed, the first speed is acquired by dividing a ratio between the first size and the second size by a sum of a first reciprocal of the receiving speed and a second reciprocal of the decompressing speed.

3. The hardware loading adjusting method of claim 1, wherein the first speed is decreased when the first speed is higher than the second speed.

4. The hardware loading adjusting method of claim 1, wherein the first speed is decreased by decreasing at least one of a receiving speed of receiving the compressed data and a decompressing speed of decompressing the compressed data.

5. The hardware loading adjusting method of claim 1, wherein when the first speed is lower than the second speed the hardware loading adjusting method further comprises:
calculating a first ratio between the second speed and a sum of the first speed and the second speed;
detecting a second ratio between the size of the compressed data and the decompressed data stored in the first storage module and the size of the first storage module;
performing a third thread for receiving and storing the compressed data to the first storage module by a third speed and performing a fourth thread for decompressing the compressed data to generate and to store the decompressed data to the second storage module by a fourth speed when the second ratio is smaller than the first ratio, wherein the third speed is higher than the fourth speed; and
performing the first thread for receiving and decompressing the compressed data to generate and to store decompressed data to the first storage module by the first speed and performing the second thread for storing the decompressed data to the second storage module by the second speed when the second ratio is greater than the first ratio.

6. The hardware loading adjusting method of claim 1, wherein the first storage module is a memory and the second storage module is a hard-disk.

7. An electronic device, comprising:
a first storage module;
a second storage module;
a computing module, for performing a first thread for receiving and decompressing the compressed data to generate and to store decompressed data to a first storage module by a first speed; performing a second thread for storing the decompressed data to a second storage module by a second speed; and adjusting a ratio between the size of the compressed data and the decompressed data stored in the first storage module and the size of the first storage module according to the relationship between the first speed and the second speed.

8. The electronic device of claim 7, wherein the computing module receives the compressed data of a first size by a receiving speed and decompresses the compressed data of the first size to the decompressed data of a second size by a decompressing speed, and the first speed is acquired by dividing a ratio between the first size and the second size by a sum of a first reciprocal of the receiving speed and a second reciprocal of the decompressing speed.

9. The electronic device of claim 7, wherein the computing module decreases the first speed when the first speed is higher than the second speed.

10. The electronic device of claim 7, wherein the computing module decreases the first speed by decreasing at least one of a receiving speed of receiving the compressed data and a decompressing speed of decompressing the compressed data.

11. The electronic device of claim 7, wherein when the first speed is lower than the second speed the computing module calculates a first ratio between the second speed and a sum of the first speed and the second speed; detects a second ratio between the size of the compressed data and the decompressed data stored in the first storage module and the size of the first storage module; performs a third thread for receiving and storing the compressed data to the first storage module by a third speed and performs a fourth thread for decompressing the compressed data to generate and to store the decompressed data to the second storage module by a fourth speed when the second ratio is smaller than the first ratio, wherein the third speed is higher than the fourth speed; and performs the first thread for receiving compressed data and decompressing the compressed data to generate and to store decompressed data to the first storage module by the first speed and performing the second thread for storing the decompressed data to the second storage module by the second speed when the second ratio is greater than the first ratio.

12. The electronic device of claim 7, wherein the first storage module is a memory and the second storage module is a hard-disk.

* * * * *

UNITED STATES PATENT AND TRADEMARK OFFICE
CERTIFICATE OF CORRECTION

PATENT NO. : 10,142,408 B2
APPLICATION NO. : 15/052892
DATED : November 27, 2018
INVENTOR(S) : Chong Zhang

Page 1 of 1

It is certified that error appears in the above-identified patent and that said Letters Patent is hereby corrected as shown below:

On the Title Page

Item (73), correct the name of the assignee from "Winstron Corporation" to --Wistron Corporation--.

Signed and Sealed this
Thirtieth Day of April, 2019

Andrei Iancu
*Director of the United States Patent and Trademark Office*